United States Patent [19]

Okimura et al.

[11] 4,453,978

[45] Jun. 12, 1984

[54] PROCESS FOR PRODUCING AN AE FLY ASH CONCRETE COMPOSITION

[75] Inventors: Hirotake Okimura, Yokohama; Hideyuki Tanaka, Fukuoka, both of Japan

[73] Assignee: Onoda Cement Company, Ltd., Onoda, Japan

[21] Appl. No.: 417,156

[22] Filed: Sep. 13, 1982

[30] Foreign Application Priority Data

Sep. 22, 1981 [JP] Japan .................................. 56-148713

[51] Int. Cl.³ .............................................. C04B 21/10
[52] U.S. Cl. .................................. 106/88; 106/DIG. 1
[58] Field of Search ...................... 106/86, 88, DIG. 1

[56] References Cited

U.S. PATENT DOCUMENTS

| | | | |
|---|---|---|---|
| 3,537,869 | 11/1970 | Proell | 106/86 |
| 4,210,457 | 7/1980 | Dodson et al. | 106/DIG. 1 |
| 4,268,316 | 5/1981 | Wills | 106/DIG. 1 |

*Primary Examiner*—James Poer
*Attorney, Agent, or Firm*—Wenderoth, Lind & Ponack

[57] ABSTRACT

This invention relates to a process for producing a concrete mixture containing an AE fly ash cement having substantially no fluctuation of entrained air contained therein regardless of the amount of unburnt carbon in the fly ash which comprises mixing an aggregate, water, and an AE fly concrete composition characterized in that polyoxyethylenesorbitan oleate having 16 to 41 molar ethylene oxide group for mole of said polyoxyethylenesorbitan oleate is used as said AE agent.

2 Claims, No Drawings

PROCESS FOR PRODUCING AN AE FLY ASH CONCRETE COMPOSITION

BACKGROUND OF THE INVENTION

The present invention relates to a process for producing a concrete mixture containing an AE (air entraining) fly ash cement (hereinafter called "AE fly ash concrete").

It has been already known in the art that AE fly ash concrete compositions have a wide variety of advantages such as providing improvement of workability in concreting, requiring less water for unit volume of concrete composition, enhancing the long term strength, improving both water tightness and durability, and reducing the heat of exothermic hydration resulting from a ball-bearing like effect of fly ash, the binding action of the cement components with the silicate contained in fly ash, the air-entraining effect by the addition of air-entraining agent, and the dilution effect of the cement components resulting from the addition of fly ash to concrete composition in combination.

Fly ash, however, contains an unspecified amount of unburnt carbon which absorbs the AE agent, thus resulting in a diminished AE effect and rendering it difficult to control the quantity of air to be entrained in fly ash concrete. For these reasons it is preferable to use fly ash having a minimum amount of unburnt carbon for fly ash concrete. This, however, is not readily available. If an producing AE fly ash concrete by using unburnt carbon-containing fly ash, for example an AE agent sold under the trade name of "Vinsol" by Yamaso Kagaku K. K. is added in the same ordinary amount specified by its producer to a fly ash concrete composition, the air content in the resulting concrete composition is far less than desired and thus no concrete composition containing the desired amount of air can be obtained. For this reason, as one way for ensuring that the desired amount of air is present in AE fly ash either 3 to 5 times the amount of AE agent in standard use is added by a trial-and-error method depending on the fluctuations in the quality and quantity of fly ash employed, or the amount of AE agent to be added is determined by previously confirming the amount of AE agent adsorbed by fly ash using the methylene blue absorption test. These methods, however, not only make the procedure very complex, but also give rise to a phenomenon of AE agent adsorption by unburnt carbon in the course of transport of the ready-mixed concrete by a truck-agitator resulting in the decrease of air in the ready-mixed concrete in combination with ordinary natural degassing. Thus the control of the amount of air in AE fly ash concrete composition is quite troublesome.

SUMMARY OF THE INVENTION

According to the invention it has been found that an AE fly ash concrete composition in which the amount of air contained therein is unaffected by the unburnt carbon remaining in the fly ash can be produced by the use of a lipophilic surfactant of a type of sorbitan-higher aliphatic acid ester, especially a water soluble polyoxyethylenesorbitan oleate on the basis of the discovery that said oleate is not substantially adsorbed by unburned carbon contained in fly ash and exhibits an excellent air-entraining effect.

DESCRIPTION OF THE PREFERRED EMBODIMENT

For the purpose of overcoming the disadvantages included in the prior art AE agents, thus leading to a novel method for producing an AE fly ash concrete composition, many experiments were carried out. The results are explained in more detail hereinafter.

EXPERIMENT EXAMPLE 1

An AE agent sold by Toho Kagaku Kogyo K. K. under the trade name of "Sorbon T-80", which is a water soluble polyoxyethylenesorbitan oleate having 28 moles of ethyleneoxide group in one molecule, was used in their experiment, while in a comparative experiment there is used a hydrophilic surfactant sold by Yamaso Kagaku K. K. under the trade name "Vinsol".

As set forth in Table 1, three types of fly ash were used having different unburnt carbon contents, thus having different methylene blue adsorption characteristics.

TABLE 1

| type of fly ash | ignition loss (%) | methylene blue adsorption (mg/g) | specific gravity | "Blain" specific surface area (cm$^2$/g) |
|---|---|---|---|---|
| 1 | 2.1 | 0.38 | 2.12 | 3430 |
| 2 | 4.0 | 0.59 | 2.18 | 3320 |
| 3 | 5.8 | 0.90 | 2.14 | 3750 |

The above types of fly ash were previously mixed with normal Portland cement in a weight ratio of 2:8 (fly ash: normal Portland cement) to produce a fly ash cement composition. The formulation for AE fly ash concrete employed in the experiments was determined by trial mixing and by maintaining the desired air content after mixing of concrete at 4.5% by volume, the desired slump at 18 cm, and the water/fly ash cement weight ratio at 55.0%. The formulation thus obtained is shown in Table 2.

TABLE 2

| 1 W/C (%) | 2 S/a (%) | W$^3$ (kg/m$^3$) | C$^4$ (kg/m$^3$) | S$^5$ (kg/m$^3$) | G$^6$ (kg/m$^3$) |
|---|---|---|---|---|---|
| 55.0 | 38.0 | 165 | 300 | 692 | 1159 |

Note:
$^1$water/fly ash weight ratio;
$^2$river sand (S) total aggregate (a) volume ratio;
$^3$quantity of water per cubic meter of concrete composition;
$^4$quantity of fly ash cement per cubic meter of concrete composition, the contents of fly ash being 20 percentage by weight;
$^5$quantity of river sand per cubic meter of concrete composition;
$^6$quantity of river gravel per cubic meter of concrete composition.

Then, the quantity of AE agent required for achieving a desired 4.5% by volume quantity air in an AE fly ash concrete composition is determined with the same concrete formulation except for the AE agent. The results are shown in Table 3.

TABLE 3

| methylene blue adsorption by fly ash (mg/g) | AE agent type | quantity employed (g/m$^3$) | air content (%) | slump (cm) | compression strength (kg/cm$^2$) 7 days | 28 days |
|---|---|---|---|---|---|---|
| 0.28 | Sorbon T-80 | 212 | 4.7 | 18.5 | 175 | 274 |
|  | Vinsol | 165 | 4.6 | 18.5 | 177 | 266 |

TABLE 3-continued

| methylene blue adsorption by fly ash (mg/g) | AE agent type | quantity employed (g/m³) | air content (%) | slump (cm) | compression strength (kg/cm²) 7 days | 28 days |
|---|---|---|---|---|---|---|
| 0.59 | Sorbon T-80 | 220 | 4.5 | 18.5 | 174 | 270 |
|  | Vinsol | 240 | 4.4 | 18.0 | 172 | 259 |
| 0.90 | Sorbon T-80 | 224 | 4.3 | 18.0 | 170 | 282 |
|  | Vinsol | 540 | 4.5 | 18.5 | 157 | 249 |

Table 3 shows that when Sorbon T-80 is employed, even if the methylene blue adsorption by fly ash is fluctuated, the desired quantity of air in the concrete composition can be achieved without substantially varying the quantity of Sorbon T-80. Thus it has been recognized that Sorbon T-80 is unaffected by the quantity of unburnt carbon in the concrete composition, while the use of Vinsol shows that the quantity of Vinsol employed linearly increases in proportion to the increase of methylene blue adsorption of fly ash.

EXPERIMENTAL EXAMPLE 2

AE fly ash concrete compositions were prepared by mixing fly ash having properties as shown in Table 4 with normal Portland cement (C), river sand (S), river gravel (G), water (W), and AE additives in proportions as shown in Table 5. As the AE additive, seven polyoxyethylenesorbitan oleates having added ethylene oxide in molar amounts, of 12, 16, 23, 28, 34, 41, and 46 were used.

TABLE 4

| ignition loss (%) | methylene blue adsorption (mg/g) | specific gravity | "Blain" specific area (cm²/g) |
|---|---|---|---|
| 4.0 | 0.59 | 2.18 | 3320 |

TABLE 5

| W/C (%) | S/a (%) | W (kg/m³) | C (kg/m³) | S (kg/m³) | G (kg/m³) | AE agent (g/m³) |
|---|---|---|---|---|---|---|
| 55.0 | 38.0 | 165 | 300 | 692 | 1159 | 220 |

Note:
C fly ash cement containing 20 percent by weight fly ash.

The results of the above tests are shown in Table 6.

TABLE 6

| molar amount of ethylene oxide incorporated | air content (%) | slump (cm) | compressive strength (kg/cm²) 7 days | 28 days |
|---|---|---|---|---|
| 12 | 1.5 | 16.0 | 188 | 290 |
| 16 | 2.4 | 17.0 | 181 | 282 |
| 23 | 3.6 | 18.0 | 180 | 276 |
| 28 | 4.5 | 18.5 | 174 | 270 |
| 33 | 3.8 | 18.0 | 176 | 275 |
| 41 | 2.7 | 17.5 | 179 | 277 |
| 46 | 1.8 | 16.5 | 185 | 288 |

Table 6 shows that the air content in the concrete composition is decreased if the molar amount of the ethylene oxide group incorporated per molecule of polyoxyethylenesorbitan oleate is less than 16 or more than 41.

The present invention, on the basis of the foregoing discovery, resides in a process for producing an AE fly ash concrete composition comprising mixing an aggregate, water, and an AE agent with fly ash cement characterized in that polyoxyethylenesorbitan oleate having a 16 to 41 molar ethylene oxide group per molecule of said oleate is used as the AE agent.

The cement employed in the present invention may comprise an inorganic hydraulic cement such as a Portland cement, Portland blast-furnace cement, alumina cement and the like. As for the fly ash used, all the fine ash recovered by dust collectors from the flue gas of a fine coal combustion boiler may be used. For the polyoxyethylenesorbitan oleate employed as the AE agent, there may be used a water soluble one having an ethylene oxide group in the range of 16 to 41 and preferably having 23 to 33 moles incorporated therein per molecule of said oleate. If the ethylene oxide group is below 16 moles, the AE agent decreases in water solubility and it becomes a suspensoid upon mixing water thus resulting in the decrease of the AE effect which makes it unappropriate for use. If the amount of ethylene oxide is in excess of 41 moles, the surface active capacity is rapidly decreased and thus it can not be used as an AE agent, although the water solubility is restrained.

The reason why the polyoxyethylenesorbitan oleate employed in the present invention is unaffected by the presence of unburnt carbon in fly ash is not clearly understood. It may, however, stem from the effect of double bonds in the oleic group or it may be due to the fact that the hydrophillic ethylene oxide group in a specified molar amount and the lipophilic oleic group are delicately influenced by each other, and due to the above facts said polyethylenesorbitan oleate exercises its surface active action without being adsorbed by the unburnt carbon. Also the entrainment of a desired quantity of air can be achieved with substantially no fluctuation of said entrained air as a function of time.

The amount of polyoxyethylenesorbitan oleate to be employed in the process of the present invention is in the range of 0.03 and 0.1%, for example in the order of 0.07%, almost irrelevant to both the fly ash content and the quantity of unburnt carbon in said fly ash. It is desirable to determine the quantity by trial mixings.

In producing the AE fly ash concrete composition of the present invention, the polyoxyethylenesorbitan oleate is dissolved in water which is then mixed with a cement, fly ash, an aggregate, and mixing-water, similar to the case of using previously known AE agents. Any commercially available surfactants, such as a cement dispersant, water reducing agent, and the like can be employed in combination with the concrete composition of the present invention without adversely affecting the properties of said concrete composition.

When the concrete composition is made according to the present invention, the resulting ready mixed concrete does not either change in the amount of entraining air during carrying in a truck agitator or give rise to such a phenomenon as hardening generally referred to as "air drop" or "slump drop" and should air drop or slump drop occur it is only minimal.

The following Examples will illustrate the process of the present invention.

EXAMPLE 1

River sand, an artificial light-weight aggregate (a coarse aggregate), commercially available Sorbon-T (polyoxyethylenesorbitan oleate having 28 mole of ethylene oxide group (incorporated therein per molecule of said oleate), and water were added to JIS-specification B-type fly ash cement containing 18% by weight fly ash and mixed together to form the AE fly ash concrete formulation set forth in Table 7. Table 7 also includes the formulation containing commercially available AE agent, "Vinsol" for comparison.

TABLE 7

| W/C (%) | S/a (%) | W (kg/m³) | C (kg/m³) | S (kg/m³) | G (kg/m³) | AE agent (g/m³) Sorbon T-80 | Vinsol |
|---|---|---|---|---|---|---|---|
| 50.0 | 50.5 | 190 | 380 | 823 | 398 | 240 | 285 |

In Table 7, C ... represents B type fly ash cement, S ... represents pit sand, and G ... represents artificial light-weight aggregate having a particle size in the range between 5 mm and 15 mm. The quanties of the AE agents in Table 7 were determined to adjust the quantity of air in concrete composition and the slump value to their desired values.

The test results obtained by the use of the formulated AE fly ash concrete are shown in Table 8.

TABLE 8

| | Items | | | | | | | | |
|---|---|---|---|---|---|---|---|---|---|
| | air content (%) | | | slump (cm) | | | compressive strength of concrete (kg/cm²) | | |
| AE agent | directly after mixing | after 30 min. | after 60 min. | directly after mixing | after 30 min. | after 60 min. | 7 days | 28 days | 91 days |
| Sorbon T-80 | 5.4 | 5.6 | 5.6 | 20.0 | 19.5 | 18.5 | 225 | 329 | 358 |
| Vinsol | 5.5 | 3.9 | 3.2 | 20.0 | 18.5 | 16.5 | 222 | 314 | 352 |

Table 8 shows that the formulated concrete composition exhibits no air-drop phenomenon, but the comparative formulation including "Vinsol" showed an air-drop phenomenon in the order of 23% after 60 minutes, said air-drop will give rise to problems upon application of said concrete composition.

The slump-drop occurred both in the concrete composition of the present invention and the comparative example, but the magnitude of said drop of the concrete composition of the present invention was about one-half of that of the comparative example, and slump drop remained in the same range after 60 minutes, thereby offering no specific problems in the case of the concrete composition of the present invention, whereas for the concrete composition of the comparative example, it was large enough to cause problems upon application.

The specific AE agent employed in the concrete composition of the present invention has no adverse effect on the compressive strength of the hardened concrete.

EXAMPLE 2

River sand, a coarse aggregate (a mixture of 1:1 weight ratio of river gravel and crushed lime stone), commercially available "Sorbon T-80" (28 moles ethylene oxide adduct), and water were added to JIS-specification A-type fly ash cement containing 9% by weight of fly ash and mixed together to form an AE fly ash concrete formulation set forth in Table 9. Table 9 also includes a formulation containing commercially available "Vinsol" as an AE agent for comparison (Comparative Example).

TABLE 9

| W/C (%) | S/a (%) | W (kg/m³) | C (kg/m³) | S (kg/m³) | G (kg/m³) | AE agent (g/m³) "Sorbon" T-80 | Vinsol |
|---|---|---|---|---|---|---|---|
| 54.9 | 42.5 | 161 | 293 | 781 | 1085 | 210 | 165 |

Note:
C stands for an A-type fly ash cement;
S stands for pit sand;
G stands for a mixture of 1:1 in weight ratio of river sand and crushed lime stone.

The test results obtained from these AE fly ash concretes are reproduced in Table 10.

TABLE 10

| | Items | | | | | | | | |
|---|---|---|---|---|---|---|---|---|---|
| | air content (%) | | | slump (cm) | | | compressive strength of concrete (kg/cm²) | | |
| AE agent | directly after mixing | after 30 min. | after 60 min. | directly after mixing | after 30 min. | after 60 min. | 7 days | 28 days | 91 days |
| Sorbon T-80 | 4.0 | 4.5 | 4.3 | 16.0 | 15.5 | 15.0 | 218 | 305 | 345 |
| Vinsol | 4.5 | 3.6 | 2.4 | 16.0 | 15.0 | 13.5 | 211 | 289 | 326 |

Table 10 demonstrate that the concrete composition containing "Sorbon" T-80 produces no air-drop with the passage of time, whereas the comparative concrete composition produces an air drop in the order of 2.1% after 60 minutes which is large enough to cause problems upon application.

The slump drop occurred in the concrete compositions of both the present invention and the comparative example, but the magnitude of the drop of the concrete composition of the present invention was about one-half that of the comparative example. Furthermore, the magnitude of slump drop of the concrete composition of the present invention after 60 minutes remained in the same range thereby offering no specific problems whereas, for the concrete composition of the comparative example, it was large enough to cause problems upon application. The specific AE agent employed in the concrete composition of the present invention has no adverse effect on the compressive strength of the hardened concrete and showed a favourable increase of the strength said strength.

What is claimed is:

1. A process for producing a concrete mixture containing an air-entrained fly ash cement comprising mixing an aggregate, water, and an air-entraining agent with fly ash cement to produce an air-entrained fly ash concrete composition characterized in that polyoxyethylenesorbitan oleate having 23 to 33 moles of ethylene oxide group per mole of said polyoxyethylenesorbitan oleate is used as said air-entraining agent.

2. In a concrete mixture containing an air-entrained fly ash cement comprising an aggregate, water and an air-entraining agent and fly ash cement the improvement wherein polyoxyethylenesorbitan oleate having 23 to 33 moles of ethylene oxide group per mole of said polyoxyethylenesorbitan oleate is used as said air-entraining agent.

* * * * *